(12) United States Patent
Varda et al.

(10) Patent No.: US 10,498,812 B1
(45) Date of Patent: Dec. 3, 2019

(54) STATE MANAGEMENT AND OBJECT STORAGE IN A DISTRIBUTED CLOUD COMPUTING NETWORK

(71) Applicant: CLOUDFLARE, INC., San Francisco, CA (US)

(72) Inventors: Kenton Taylor Varda, Palo Alto, CA (US); Kyle Kloepper, Champaign, IL (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/425,415

(22) Filed: May 29, 2019

(51) Int. Cl.
  H04L 29/06 (2006.01)
  H04L 29/08 (2006.01)
(52) U.S. Cl.
  CPC .......... H04L 67/1095 (2013.01); H04L 67/34 (2013.01); H04L 67/42 (2013.01)
(58) Field of Classification Search
  CPC . H04L 67/1097; H04L 67/1095; H04L 67/34; H04L 67/42; H04L 63/10; H04L 63/101; G06F 11/30
  USPC ......................................................... 709/248
  See application file for complete search history.

(56) References Cited

U.S. PATENT DOCUMENTS

| | | | |
|---|---|---|---|
| 9,411,671 B1* | 8/2016 | Johnson | G06F 16/9024 |
| 10,152,467 B2 | 8/2018 | Chan et al. | |
| 10,333,711 B2* | 6/2019 | Fleischman | H04L 9/3213 |
| 2013/0117252 A1* | 5/2013 | Samaddar | G06F 16/951 |
| | | | 707/709 |
| 2014/0123316 A1* | 5/2014 | Leggette | H04L 67/1097 |
| | | | 726/28 |
| 2014/0149794 A1* | 5/2014 | Shetty | H04L 67/1095 |
| | | | 714/20 |
| 2014/0215574 A1* | 7/2014 | Erb | H04L 63/10 |
| | | | 726/4 |
| 2017/0330149 A1 | 11/2017 | Hunter et al. | |
| 2018/0114015 A1* | 4/2018 | Nuseibeh | G06F 21/552 |

OTHER PUBLICATIONS

Meryeme Ayache et al., "Access Control Policies Enforcement in a Cloud Environment: Openstack," Dec. 2015, IEEE, 2015 11th International Conference on Information Assurance and Security (IAS), ieeexplore.ieee.org/document/7492740 (Year: 2015).*
How Sandstorm Works: Containerize data, not services, Feb. 28, 2019, 12 pages, downloaded at: https://web.archive.org/web/20190228074058/https:/sandstorm.io/how-it-works.

* cited by examiner

Primary Examiner — Ruolei Zong
(74) Attorney, Agent, or Firm — Nicholson De Vos Webster & Elliott LLP (57) ABSTRACT

A first compute server of a distributed cloud computing network receives a request from a first client device for an object to be handled by an object worker that includes a single instantiation of a piece of code that solely controls reading and writing access to the first object. A determination is made that the object worker is instantiated for the object and is currently running in the first compute server, and the piece of code processes the first request. The first compute server receives a message to be processed by the first object worker from a second compute server. The message includes a second request for the object from a second client device connected to the second compute server. The piece of code processes the message and transmits a reply to the second compute server.

21 Claims, 6 Drawing Sheets

STATE MANAGEMENT AND OBJECT STORAGE IN A DISTRIBUTED CLOUD COMPUTING NETWORK

FIELD

Embodiments of the invention relate to the field of computing; and more specifically, to state management and object storage in a distributed cloud computing network.

BACKGROUND

There are several different ways to store data. A common approach is to use a monolithic database model that is fundamentally centralized. These databases are sometimes claimed to be distributed, but they either are based on a global synchronization procedure (e.g., consistent and partition tolerant) or eventual consistency through merging changes (e.g., highly available and partition tolerant). Global synchronization can be slow especially as the distributed database and the number of nodes grows. Eventual consistency is difficult to do correctly and is error prone.

SUMMARY

A first compute server of a distributed cloud computing network receives a request from a first client device for an object to be handled by an object worker that includes a single instantiation of a piece of code that solely controls reading and writing access to the first object. A determination is made that the object worker is instantiated for the object and is currently running in the first compute server, and the piece of code processes the first request. The first compute server receives a message to be processed by the first object worker from a second compute server. The message includes a second request for the object from a second client device connected to the second compute server. The piece of code processes the message and transmits a reply to the second compute server. Processing, with the piece of code, may include reading and/or writing to the first object. Processing, with the piece of code, may include retrieving the object from a remote object storage.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for state management and object storage in a distributed cloud computing network is described. Data is separated into one or more units referred herein as objects. For instance, objects may be created in a way that they tend to be accessed by the same set or set of clients. By way of example, each document of a collaborative document editing system may be a separate object. In an embodiment, a developer splits their data into objects in a way that they choose. A single object is owned by a single instantiation of a piece of code that can read and/or modify the object while the single piece of code is executing. Other entities that wish to read and/or modify the object communicate with the single instantiation of the piece of code that owns the object.

The single instantiation of the piece of code and/or the object are automatically migrated to be close to the clients that are accessing the object. For instance, if not currently running, the single piece of code may be instantiated at a first server of the distributed cloud computing network that is close to the client that is requesting access to the object. When access to that object is complete, the single piece of code may be instantiated at a second server of the distributed cloud computing network that is close to a subsequent client that is requesting access to the object.

As referred herein, an object worker includes a combination of the single instantiation of a piece of code and the object that belongs to the single instantiation of the piece of code. Each instance of an object worker has its own private and persistent data that the object worker can read and/or modify and which no other object worker can directly access. Thus, the single instantiation of the piece of code solely controls reading and/or writing access to the object in which it controls. The piece of code can be, for example, a piece of JavaScript or other interpreted language, a WebAssembly (WASM) compiled piece of code, or other compiled code. In an embodiment, the piece of code is written against standard Web Platform APIs such as the W3C standard ServiceWorker API for receiving HTTP requests. For purposes of this description, each piece of code is referred to as an object worker script, and each single instantiation of the piece of code is referred to as an instantiated object worker script. The object of an object worker may be persistently located in storage (e.g., object storage). An object worker locks the data such that it is the sole owner of the data while it is being executed. Other entities that wish to interact with the data send messages to the object worker that owns the data.

Object workers may be executed in a distributed cloud computing network. The distributed cloud computing network includes multiple compute servers that are geographically distributed (e.g., in different locations throughout the world). There may be hundreds of compute servers that are geographically distributed in different points-of-presences (PoPs). An object worker may migrate between different compute servers. For instance, an object worker may migrate to a particular compute server because that compute server is the one physically closest to the user that is interacting with the data of the object worker.

Control over an object may be transferred. For instance, a compute server may wish to take ownership over an object. To do so, the new compute server may transmit a message requesting ownership over the object. The compute server that has ownership over the object may agree to the transfer or may not agree to the transfer. In an embodiment, transfer of ownership may be automatically determined based on the amount of time with which the object was last interacted through the owner, the number of interactions of the object over a period of time, and/or an expected amount of interactions of the object.

Figure 1:
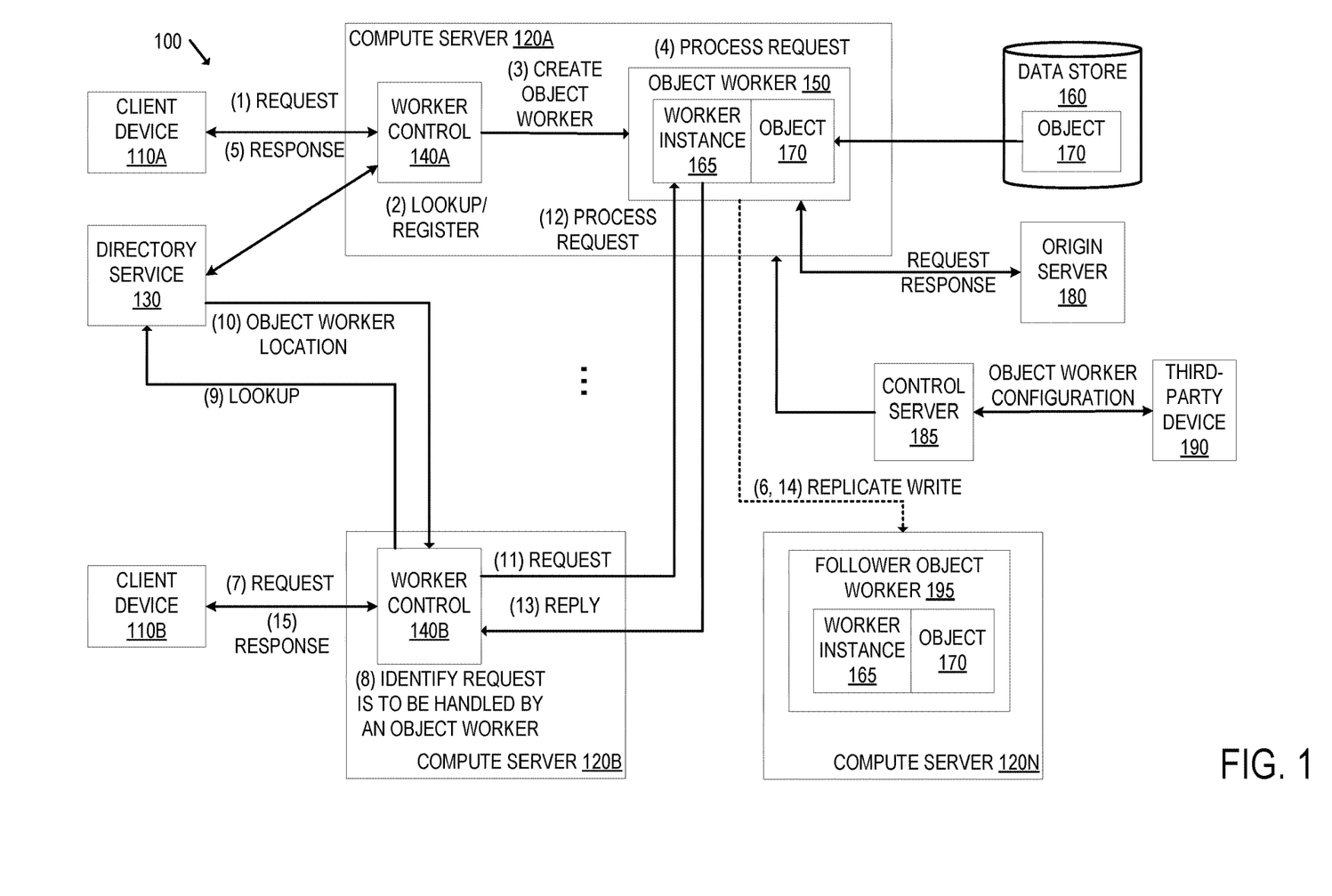
FIG. 1 illustrates an exemplary embodiment for state management and object storage in a distributed cloud computing network according to an embodiment.

FIG. 1 illustrates an exemplary embodiment for state management and object storage in a distributed cloud computing network according to an embodiment. The system 100 includes the client devices 110A-B, the compute servers 120A-N, the data store 160, the origin server 180, the control server 185, and the third-party device 190.

Each client device is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the distributed cloud computing network. The compute servers 120A-N are geographically distributed (e.g., in different locations throughout the world). There may be hundreds or more compute servers 120. Each compute server 120 may include one or more physical servers that are part of the same PoP. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

Since the compute servers 120A-N are geographically distributed, the distance between requesting client devices and the compute servers is decreased which decreases the time necessary to respond to a request. The compute servers 120A-N may operate as a reverse proxy and receive request for network resources (e.g., HTTP requests) of a domain of the origin server 180. The particular compute server 120 that receives a request from a client device may be determined by the network infrastructure according to an Anycast implementation or by a geographical load balancer. For instance, the compute servers 120A-N may have a same anycast IP address for a domain of the origin server 180. If the origin server 180 handles the domain "example.com", a DNS request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A of the compute servers 120A-N and the client device 110B is closest to the compute server 120B of the compute servers 120A-N. Accordingly, requests from the client device 110A are received at the compute server 120A and requests from the client device 110B are received at the compute server 120B. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

Each compute server may execute an object worker. As described above, each object worker includes a combination of an instantiation of a piece of code and an object that belongs to the instantiation of the piece of code. Each instance of an object worker has its own private and persistent data that the object worker can read and/or modify and which no other object worker can directly access. The piece of code can be, for example, a piece of JavaScript or other interpreted language, a WebAssembly (WASM) compiled piece of code, or other compiled code. In an embodiment, the piece of code is written against standard Web Platform APIs such as compliant with the W3C standard ServiceWorker API for receiving HTTP requests. An object worker locks the data such that it is the sole owner of the data while it is being executed. Other entities that wish to interact with the data send messages to the object worker that owns the data. In an embodiment, each instantiated object worker script is run in an isolated execution environment, such as run in an isolate of the V8 JavaScript engine. The isolated execution environment can be run within a single process. In an embodiment, the instantiated object worker scripts are not executed using a virtual machine or a container. In an embodiment, a particular object worker script is loaded and executed on-demand (when and only if it is needed) at a particular compute server of the distributed cloud computing network.

The origin server 180, which may be owned or operated directly or indirectly by a customer of the cloud computing platform, is a computing device on which a network resource resides and/or originates (e.g., web pages, images, word processing documents, PDF files movie files, music files, or other computer files). In an embodiment, the origin server 180 is not required such that a compute server can respond to a request without querying an origin server.

The control server 185 is operated by the cloud computing platform and provides a set of tools and interfaces for a customer to, among other things, configure object workers to be run in the cloud computing platform. The third-party device 190 is a computing device (e.g., laptop, workstation, smartphone, mobile phone, tablet, etc.) that is used by third-parties such as a customer, among other things, interact with the control server 185. For instance, the control server 185 may allow the customer to indicate how the data is to be split into one or more units.

The customer can split the data into units that tend to be accessed by the same client or sets of client. This allows the object to naturally migrate to near where the client(s) are accessing the data thereby providing fast, low-latency access. The following are examples in how the data can be split. If the customer is providing a collaborative document editing system, each document of the system may be a separate object. If the customer is providing an online gaming service, each game session may be a separate object. For an online email service, each user's mailbox may be a separate object. For a calendar service, each user's calendar may be a separate object. For a team chat product, each channel may be a separate object.

The control server 185 may allow the customer to upload one or more object worker scripts and specify when the object worker script(s) are to be run. For instance, the customer may associate a rule that indicates when an object worker script is to be run. By way of example, the control server 185 may allow the customer to configure a URL matching pattern that indicates the URL(s) for which the object worker script is to run. The control server 185 may allow the customer to delete and update previously uploaded object worker script(s).

In an embodiment, the control server 185 deploys each object worker script to each of the compute servers 120A-N automatically (without the customer selecting which of the compute servers 120A-N in which to deploy the object worker script). In another embodiment, the control server 185 allows the customer to indicate which of the compute servers 120A-N are to be deployed a particular worker script. The control server 185 creates an identifier for each unique object worker script. In an embodiment, the identifier is created by hashing the content of the object worker script (e.g., using a cryptographic hash function such as SHA-256), where two scripts with identical content will have the same identifier even if uploaded by different customers and even if applied to different zones.

In an embodiment, the control server 185 allows a customer to provision the service to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 185 to change their authoritative name server to an authoritative name server of the cloud computing platform and/or change their zone file records to have their domain point to the compute servers.

At an operation 1, the compute server 120A receives a request from the client device 110A for an identified object. The request may be an HTTP request, HTTPS request, or other protocol request. In an embodiment, the compute server 120A receives this request because it is the closest one of the compute servers 120A-N to the client device 110A in terms of routing protocol configuration (e.g., BGP configuration) according to an anycast implementation as determined by the network. As an example, the request is an HTTP/S request for an object located at "example.com/object/1234". The origin server 180 may be the origin server for the domain "example.com."

The compute server 120A determines that the request is to be handled by an object worker. This determination may be made by the worker control 140A being executed by the compute server 120A. The worker control 140A may be a script that determines that the request is to be handled by an object worker. For instance, the script may determine an object ID for the requested object worker and forward the request to the appropriate instance of the object worker script. In another embodiment, the worker control 140A may analyze the request URL against a URL matching pattern configured for the zone to determine if an object worker is to handle the request. For instance, the request URL of "example.com/object/1234" may match a predefined matching pattern for determining that an object worker is to handle the request.

An object worker to handle the requested object may or may not be currently running and/or previously instantiated at the time the request is received at the compute server 120A. In an embodiment, a single instantiated object worker becomes the sole owner of the object for which it is handling while that object worker is executing. All requests are processed by that object worker. The worker control 140A checks the directory service 130 to determine if an object worker has been instantiated for the requested object and if so, the state of the object worker. The directory service 130 may store information that indicates whether the object worker is running, the location (e.g., which compute server) is running the object worker, and optionally the last region in which the requested object was running. A region is a group of compute servers that may be geographically near each other. A network partition may occur between regions (e.g., complete failure of communication between regions or very slow communication between regions).

If an object worker has not been previously instantiated for the requested object, a new object worker is instantiated for the requested object. If an object worker is currently running on the compute server that received the request, that object worker processes the request. If an object worker is currently running on a different compute server than the one that received the request, the request may be transmitted to that different compute server for processing the object worker. If an object worker for the requested object is not currently running and last was run in the same region as the compute server that received the request (and thus there is a low chance of a network partition), that compute server can instantiate the object worker for the requested object. If an object worker for the requested object is not currently running and was last running in a different region as the compute server that received the request (and thus is an increased chance of a network partition), then the compute server that received the request may request that ownership of the object be transferred from that different region.

In the example of FIG. 1, the worker control 140A accesses the directory service 130 at operation 2 and determines that an object worker for the requested object has not been previously instantiated. The worker control 140A registers with the directory service 130 and instantiates an object worker 150 at operation 3. Registering may include generating an identifier for the object worker (if one does not exist) and associating the identifier with the location in which the object worker will execute. For instance, the worker control 140A associates an identifier for the object worker 150 with an identifier of the compute server 120A. The object worker 150 includes an object worker script instance 165 that is an instantiated object worker script and the object 170. The object 170 corresponds to the requested object identified in the request in operation 1. The object worker script instance 165 can read and/or modify the object 170 and no other object worker can directly access the object 170.

Instantiating an object worker may include retrieving the object worker script that handles processing of the object and/or retrieving the object itself from the data store 160. In an embodiment, creation of the object worker may also include determining a leader and one or more followers to form a consensus group for the object. The object leader actually executes the instance of the object worker. The object leader replicates writes to the object follower(s). If, for instance, the object leader becomes unreachable (e.g., due to a hardware or software failure), the follower(s) may elect a new object leader. In the example of FIG. 1, the compute server 120B includes a follower object worker 195.

After the object worker 150 has been instantiated, it processes the request received from the client device 110A at operation 4. Processing the request may include reading and/or writing to the object 170. Processing the request may also include accessing the origin server 180 and/or other origin servers depending on the request. After processing the request, the compute server 120A transmits a response to the request to the requesting client device 110A at operation 5. In an embodiment, if processing the request includes writing to the object 170, the write(s) are replicated to the object followers. Thus, at operation 6, which is optional in some embodiments, a write is replicated to the follower object worker 195 of the compute server 120B.

The compute server 120B receives a request from the client device 110B at operation 7 for the object 170. In an embodiment, the compute server 120B receives this request because it is the closest one of the compute servers 120A-N to the client device 110B in terms of routing protocol configuration (e.g., BGP configuration) according to an anycast implementation as determined by the network. As an example, the request is an HTTP/S request for the object located at "example.com/object/1234". At operation 8, the worker control 140B determines that the request is to be handled by an object worker. For instance, the worker control 140B may analyze the request URL against a URL matching pattern configured for the zone to determine if an object worker is to handle the request.

At operation 9, the worker control 140B accesses the directory service 130 to determine if an object worker has been instantiated for the requested object and if so, the state of the object worker. In this example, the object worker 150 is being executed by the compute server 120A at the time of the request in operation 7. Accordingly, the directory service 130 returns the location of where the object worker for the requested object is currently running (e.g., an identifier of the compute server 120A) to the worker control 140B at operation 10.

Since the object worker is not running on the compute server 120B, the worker control 140B transmits a message to the compute server 120A for the object worker 150 to process at operation 11. For instance, the worker control 140B may forward the request it received from the client device 110B in operation 6 to the compute server 120A for processing. The object worker 150 processes the request at operation 12, which may include reading and/or writing to the object 170. At operation 13, a reply to the request at operation 11 transmitted from the compute server 120A to the compute server 120B. If processing the request includes writing to the object 170, in an embodiment the write(s) are replicated to the follower object worker 195 at operation 14. At operation 15, the compute server 120A transmits a response to the request to the requesting client device 110A.

In an embodiment, the message for the object worker to process (e.g., the request) may be sent with the lookup request. In such an embodiment, instead of returning the location of the object worker, the directory service 130 forwards the message directly to the object worker for processing.

The object data is stored back to the data store 160. The object data may be periodically stored back to the data store 160. Alternatively, the object data is stored back to the data store 160 only after the object worker 150 has been idle for a predetermined period of time (e.g., has not received a request to process over that predetermined period of time) or when the compute server determines to abdicate ownership over the object (e.g., if the object worker 150 has not received a request to process over a predetermined period of time).

Although not illustrated in FIG. 1, the compute server 120A may stop the execution of the object worker 150 thereby abdicating ownership over the object 170. For instance, the compute server 120 may stop the object worker 150 if the object worker 150 has been idle for a predetermined period of time (e.g., if the object worker 150 has not received a request to process for the predetermined period of time). The compute server 120A may receive a request to transfer ownership over the object 170.

Figure 2:
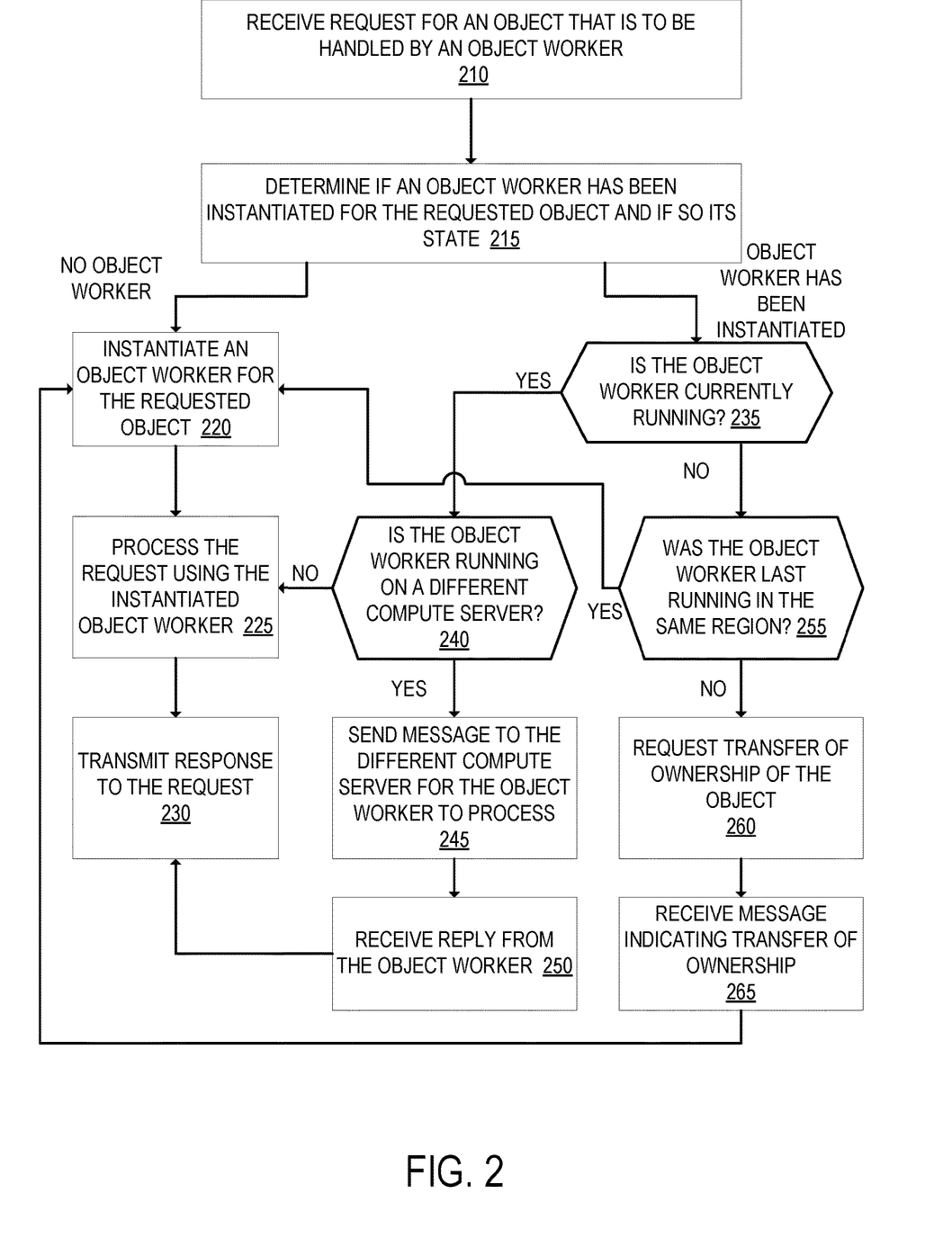
FIG. 2 is a flow diagram that illustrates exemplary operations for object worker processing according to an embodiment.

FIG. 2 is a flow diagram that illustrates exemplary operations for object worker processing according to an embodiment. The operations of FIG. 2 will be described with respect to HTTP/S request and responses. But, the operations of FIG. 2 can be performed with different types of requests and responses.

At operation 210, a first one of multiple compute servers of a distributed cloud computing network receives a request for an object that is to be handled by an object worker. Referring to FIG. 1, the request is received by the compute server 120A from the client device 110A. The request may be an HTTP request, HTTPS request, or other protocol request. The compute server determines that the request is to be handled by an object worker. In an embodiment, this determination is made by a script that determines an object ID for the requested object and forwards the request to the appropriate instance of the object worker script. In another embodiment, this determination is made by analyzing the request URL against a URL matching pattern configured for the zone to determine if an object worker is to handle the request. To provide an example, the HTTP request is an HTTP GET method for "example.com/object/1234", which matches a predefined matching pattern for determining that an object worker is to handle the request.

The distributed cloud computing network includes multiple compute servers including the first compute server. The compute servers are geographically distributed, and there may be hundreds or more compute servers. In an embodiment, the compute servers are anycasted to a same IP address, and the first compute server receives the request in operation 210 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

Next, at operation 215, the first compute server determines whether an object worker has been instantiated for the requested object and if so, the state of the object worker. For example, the first compute server may use a directory service to look up whether an object worker has been instantiated for the requested object and if so, its state. The state information may indicate the location, if any, in which the object worker is running. For instance, the directory service may indicate an identifier of the compute server that is running the object worker for the requested object. The directory service may also indicate the last region in which the requested object was running. A region is a group of compute servers that may be geographically near each other.

The directory service may use a distributed hash table. As another example, a replicated service using eventual consistency may be used. As yet another example, a hierarchical directory where the directory service for any given object is another object worker that is identified from the object's ID may be used. As yet another example, the backing object store itself may be used as the directory service by storing a file adjacent to the object and performing optimistic-concurrency transactions.

If an object worker has not been instantiated for the requested object, then operation 220 is performed. At operation 220, the first compute server instantiates an object worker for the requested object. Instantiating the object worker for the requested object may include determining what entity is going to execute the object worker and may include determining the entities that will object worker followers. In an embodiment, the first compute server is determined to execute the object worker because it is the one that received the request in operation 210. A set of one or more object worker followers may be determined. The first compute server may select other compute server(s) to be object worker followers. In an embodiment, the set of object worker followers are each located in a different data center than the first compute server. The set of object worker followers are typically located in the same region as the first compute server. Instantiating the object worker may also include retrieving the object from object storage or from its origin server, and/or retrieving the object worker script from object storage or from its origin server. Instantiating the object worker includes registering the object worker with the directory service (e.g., indicating that the object worker is executing on the first compute server).

Next, at operation 225, the object worker for the requested object processes the request. Processing the request may include reading and/or writing to the object. Next, at operation 230, the first compute server transmits a response to the request to the requesting client device. In an embodiment, if processing the request includes writing to the object, the write(s) are replicated to the object follower(s).

If an object worker has been instantiated for the requested object, at operation 235 the first compute server determines, from the state information of the object worker, whether the object worker for the requested object is currently running. If the object worker is not currently running, then operation 255 is performed. If the object worker is currently running, then at operation 240 the first compute server determines, from the state information of the object worker, whether the object worker is running on a different compute server. If the object worker is not running on a different compute server (meaning it is running on the first compute server), then operation 225 is performed. If the object worker is running on a different compute server, then operation 245 is performed.

At operation 245, the first compute server sends a message to the different compute server for the object worker to process. This message may be the request that is received in operation 210, for example. The different compute server processes the request, which may include reading and/or writing to the object. At operation 250, the first compute server receives a reply from the object worker on the different compute server in response to the request. Then, at operation 230, the first compute server transmits a response to the request to the requesting client device.

The compute servers may be logically separated into regions. A network partition may exist or come into existence between regions that affects communication between regions (e.g., a complete communication block or very slow communication). In an embodiment, an object worker can run in only a single region at a time. In an embodiment, because a controlling object worker is to run in only a single location, a determination is made whether the object worker was last running in a different region as the compute server and if it was, a transfer of ownership must occur. This prevents a compute server in one region from running the object worker concurrently with a compute server in a different region. Thus, at operation 255, the first compute server determines, from the state information of the object worker, if the object worker was last running in the same region as the first compute server. If the object worker was last running in the same region as the first compute server, then operation 220 is performed where the first compute server instantiates the object worker for the requested object. If, however, the object worker was last was last running in a different region as the first compute server, then operation 260 is performed where the first compute server requests a transfer of ownership of the object from that different region to the region of the first compute server. The first compute server may transmit a message to the compute server that is currently listed in the directory service as owning the object requesting transfer of ownership of the object.

In an embodiment, the transfer of ownership may be denied. In such a case, the other compute server may instantiate the object worker for the object. The first compute server may then transmit a message to that compute server for the object worker to process like in operation 245.

In an embodiment, if the first compute server does not receive a response to the requested transfer (e.g., a network partition has prevented communication between the regions), then the first compute server does not instantiate the object worker and process the request. In such a case, the first compute server may transmit an error message to the requesting client device.

If transfer of ownership to the first compute server is agreed upon, then the first compute server receives a message indicating transfer of ownership at operation 265. The first compute server then instantiates an object worker for the requested object at operation 220.

In an embodiment, the object worker is automatically migrated to be close to the objects with which it commonly communicates. This automatic migration may be a natural consequence of a compute server receiving a request that is to be handled by an object worker and that object worker is not currently instantiated (even if it was last running on a different compute server). As another example, the object worker may be automatically migrated based on a set of one or more parameters.

For instance, the system may track the origination of the requests (e.g., compute server and/or region) over a period of time and automatically migrate the object worker to the originator with the highest number of requests. To track the origination of the requests, a compute server that receives a request that is to be handled by an object worker causes a request received number to be incremented. The request received number may be stored in the directory service 130, for example. A number for the particular compute server and/or an aggregate number for the region may be incremented.

As another example, the system may determine the location of the object worker (e.g., which compute server or region) that has the minimum total latency and automatically migrate the object worker to that location. The minimum total latency may be determined by analyzing the latency to process each request (which may be determined with network probes). For instance, statistics may be gathered on the locations where requests are originating and a determination of the optimal location in which to serve the traffic is made based on the statistics. In an embodiment, this determination is performed by measuring the latency from each compute server or region to each client, computing the average latency weighted by the amount of traffic (e.g., the number of requests) each of those clients sent, and selecting the compute server or region that has the lowest average. In another embodiment, this determination is made by plotting the clients location on a map, computing the average latency weighted by the amount of traffic (e.g., the number of requests) between the locations, and then selecting the closest compute server or region to that average. As another example, the system may determine the location of the object worker (e.g., the location of the compute server or region) that has the minimum total of the squares of the latency.

As another example, the system may automatically migrate the object worker based on historical and/or predicted requests to be handled by the object worker. As another example, the system may automatically migrate the object worker based on which compute server or region ingresses the most total traffic for that object worker.

Figure 3:
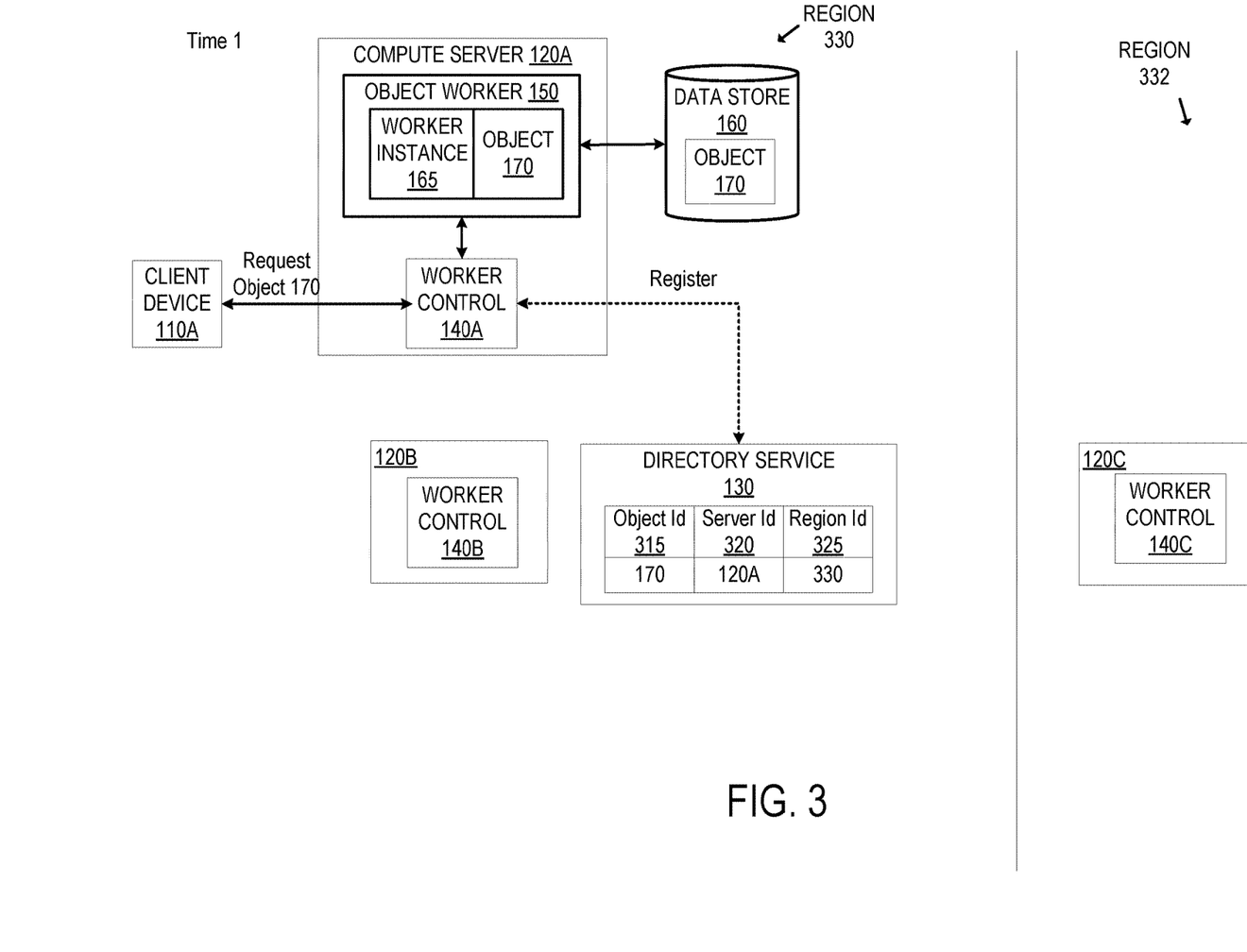
FIG. 3 illustrates a first time period showing an object worker being automatically migrated according to an embodiment.
Figure 4:
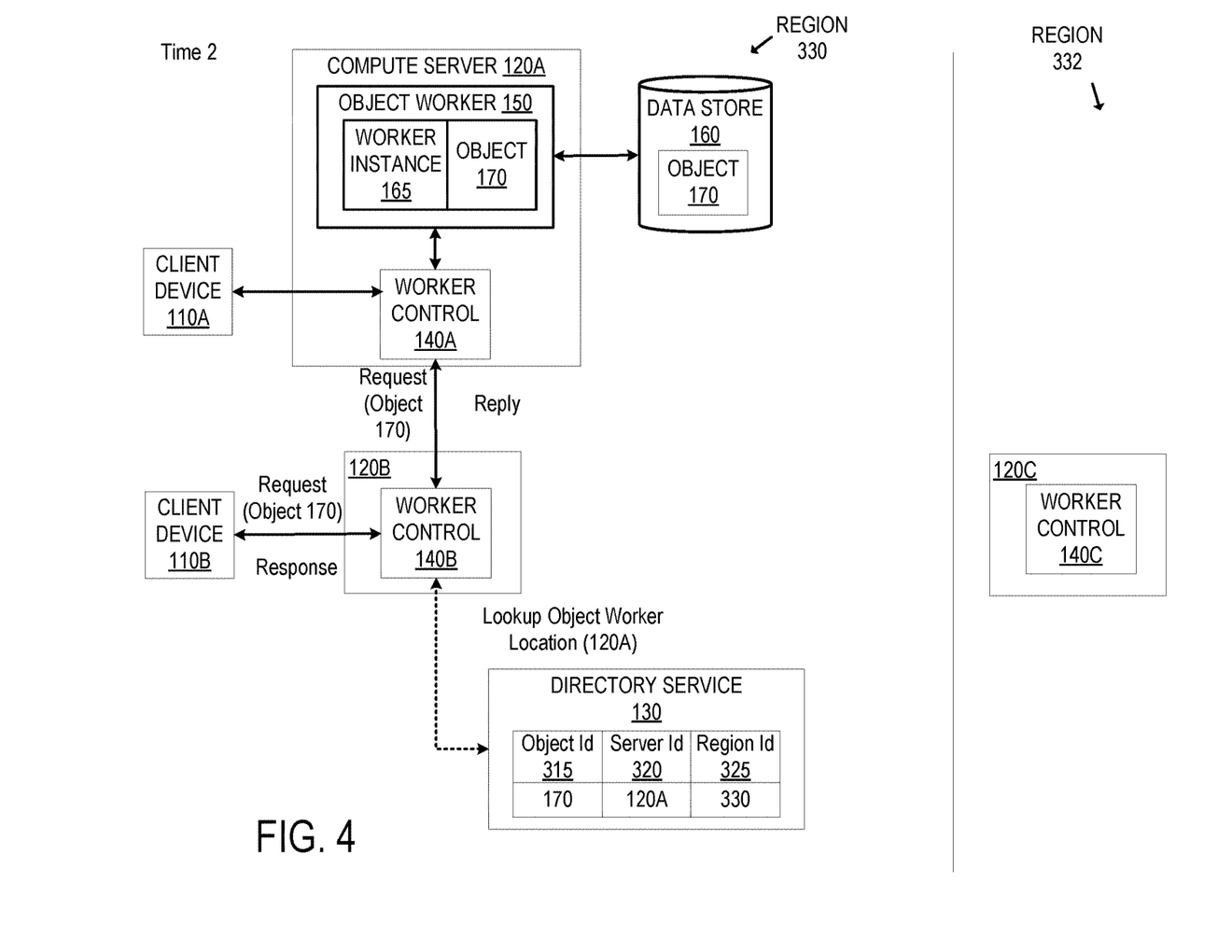
FIG. 4 illustrates a second time period showing an object worker being automatically migrated according to an embodiment.
Figure 5:
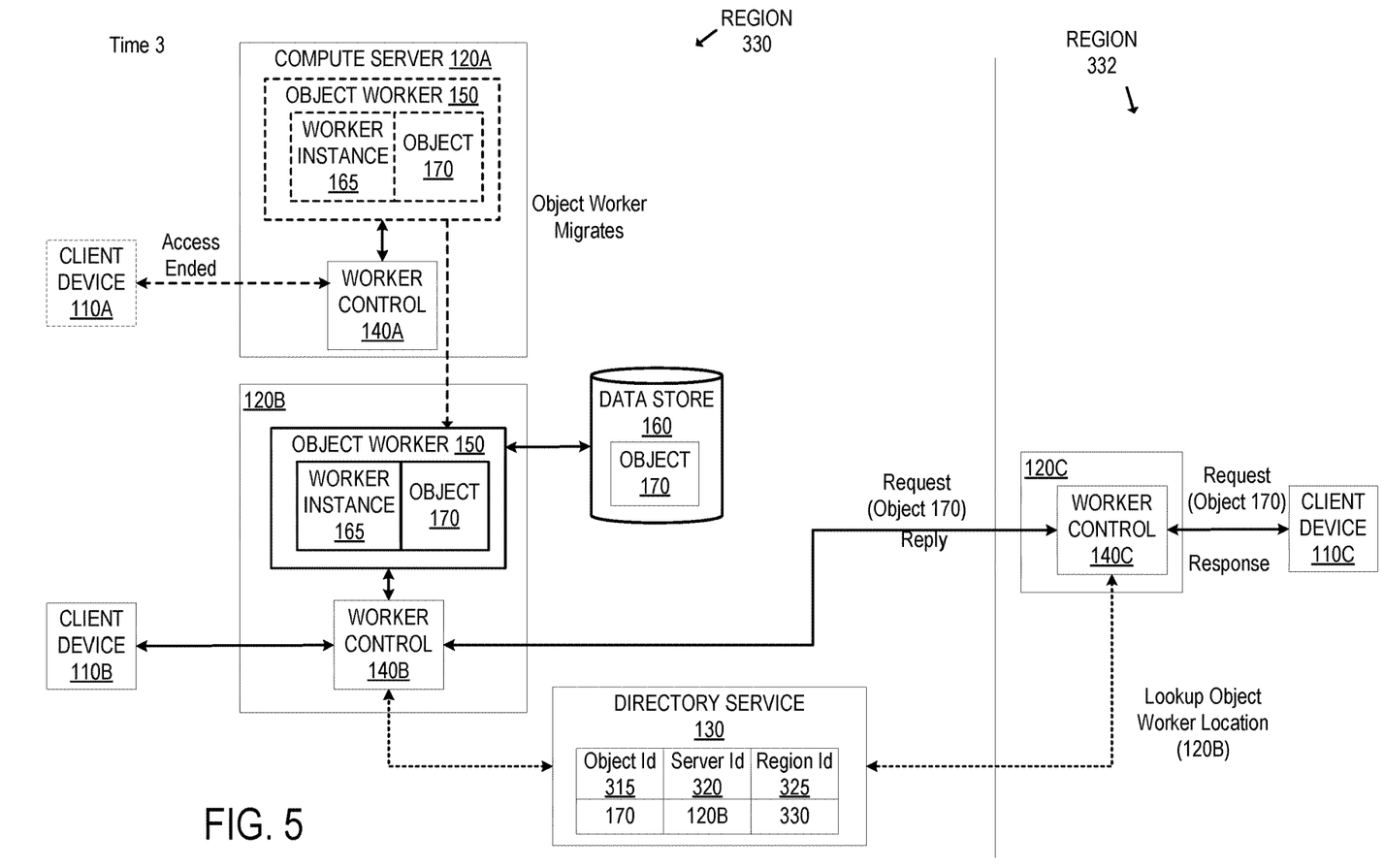
FIG. 5 illustrates a third time period showing an object worker being automatically migrated according to an embodiment.

FIGS. 3-5 illustrate an object worker being automatically migrated according to an embodiment. FIGS. 3-5 include the compute servers 120A-C of the distributed cloud computing network. FIG. 3 illustrates a time 1 where the object worker 150 is instantiated and running on the compute server 120A. The object worker 150 may be instantiated as a result of a request from the client device 110A for the object 170. The compute server 120A may receive the request from the client device 110A because it is the closest one of the compute servers 120A-N to the client device 110A in terms of routing protocol configuration (e.g., BGP configuration) according to an anycast implementation as determined by the network.

The worker control 140A accesses the directory service 130 and determines that an object worker for the object 170 has not been instantiated and then registers an object worker with the directory service 130. Registering the object worker for the object 170 may include generating an identifier for the requested object and associating the identifier with the location in which the object worker will execute. The generated object identifier is made with sufficient entropy that there will not be collisions. In an embodiment, the generated object identifier encodes an identifier of the initial consensus group or the server that is executing the object worker such that requests addressed to the object can be routed even if the directory has not yet been updated.

As illustrated in FIG. 3, the directory service 130 includes an object identifier field 315, a server identifier field 320, and a region identifier field 325. The object identifier field 315 indicates the identifier of the object. In this case, the identified object corresponds to the object 170. The server identifier field 320 indicates the server that is executing the object worker that owns the object 170. In this case, the server identifier corresponds to the compute server 120A. The region identifier field 325 indicates the region in which the object worker for the object was last instantiated. In this example, the region identifier field indicates the region 330 (which includes the compute server 120A). Although not illustrated in FIG. 3, the directory service 130 may include an identifier of the leader and identifier(s) of the follower(s). The form of the directory service 130 as illustrated in FIG. 3 is exemplary, and the directory service may take other forms and/or structure.

At the time 1, the client device 110A is the only client device that is interacting with the object 170. At a time 2, illustrated in FIG. 4, the client device 110B is requesting to interact with the object 170 while the object worker 150 is still instantiated on the compute server 120. The compute server 120B receives the request for the object 170 from the client device 110B. The compute server 120B may receive the request for the object 170 from the client device 110B (as opposed to, for example, the compute server 120A) because it is the closest one of the compute servers 120A-N to the client device 110B in terms of routing protocol configuration (e.g., BGP configuration) according to an anycast implementation as determined by the network. The worker control 140B accesses the directory service 130 for the requested object and determines that an object worker for object 170 is instantiated on the compute server 120A. The worker control 140B transmits a message to the compute server 120A (received by the worker control 140A) for the object worker 150 to process. The message may be similar to the request received from the client device 110B. The object worker 150 processes the request which may include reading and/or writing to the object 170. The worker control 140A transmits a reply to the request that is received by the worker control 140B. The worker control 140B generates a response based on the reply from the worker control 140A and transmits the response to the client device 110B.

Sometime after time 2, the access to the object 170 for the client device 110A ends. That is, the client device 110A is no longer interacting with the object 170. For instance, the browser of the client device 110A may have closed or navigated away from a page that includes the object 170. If no other client devices are interacting with the object 170, the object worker 150 may be subject for migration to another compute server. At a time 3, illustrated in FIG. 5, access to the object 170 has ended for the client device 110A and the object worker 150 has migrated to the compute server 120B. The client device 110B is interacting with the object 170 at the time 3. The directory service 130 is modified to specify that the compute server 120B has control of the object 170. The object 170 may be pushed backed to the data store 160.

In an embodiment, if the compute server that controls the object determines to abdicate ownership (e.g., if the object has been idle for a predetermined period of time), it removes itself as owner of the object from the directory service 130 (after processing any requests that may be pending for the object). The compute server may also push the object back to long-term object storage. This allows for another compute server to take ownership of the object. For instance, the compute server 120A may push the object 170 back to the data store 160 and cause the directory service 130 to specify that it is not the owner of the object 170.

In an embodiment, the compute server that controls the object maintains a list of other compute server(s) that request interactions with the object. For instance, the compute server 120A may maintain a list that indicates that the compute server 120B has requested an interaction with the object 170 (through the client device 110B). If the compute server that controls the object determines to abdicate ownership (e.g., if access to the object from locally connected client devices has been idle for some time), the compute server may transmit a message to one or more of the compute servers on the list, where the message indicates that the compute server is abdicating ownership. The other compute server(s) may respond to this message and request ownership of the object (e.g., if a client device is accessing the object).

It may be possible that a previous object owner may receive a request for the object worker before the directory service 130 has finished updating. In such a case, the previous object owner may redirect the request to the new object owner.

FIG. 5 also illustrates that a client device 110C that is located in a first region 332 may interact with an object 170 that is located in a second region 330. The compute server 120C, of the region 332, receives the request for the object 170 from the client device 110C. The compute server 120C may receive the request for the object 170 from the client device 110C (as opposed to, for example, the compute servers 120A or 120B) because it is the closest one of the compute servers 120A-N to the client device 110C in terms of routing protocol configuration (e.g., BGP configuration) according to an anycast implementation as determined by the network. The worker control 140C accesses the directory service 130 for the requested object and determines that an object worker for object 170 is instantiated on the compute server 120B. The worker control 140C transmits a message to the compute server 120B (received by the worker control 140B) for the object worker 150 to process. The message may be similar to the request received from the client device 110C. The object worker 150 processes the request which may include reading and/or writing to the object 170. The worker control 140B transmits a reply to the request that is received by the worker control 140C. The worker control 140C generates a response based on the reply from the worker control 140B and transmits the response to the client device 110C.

Figure 6:
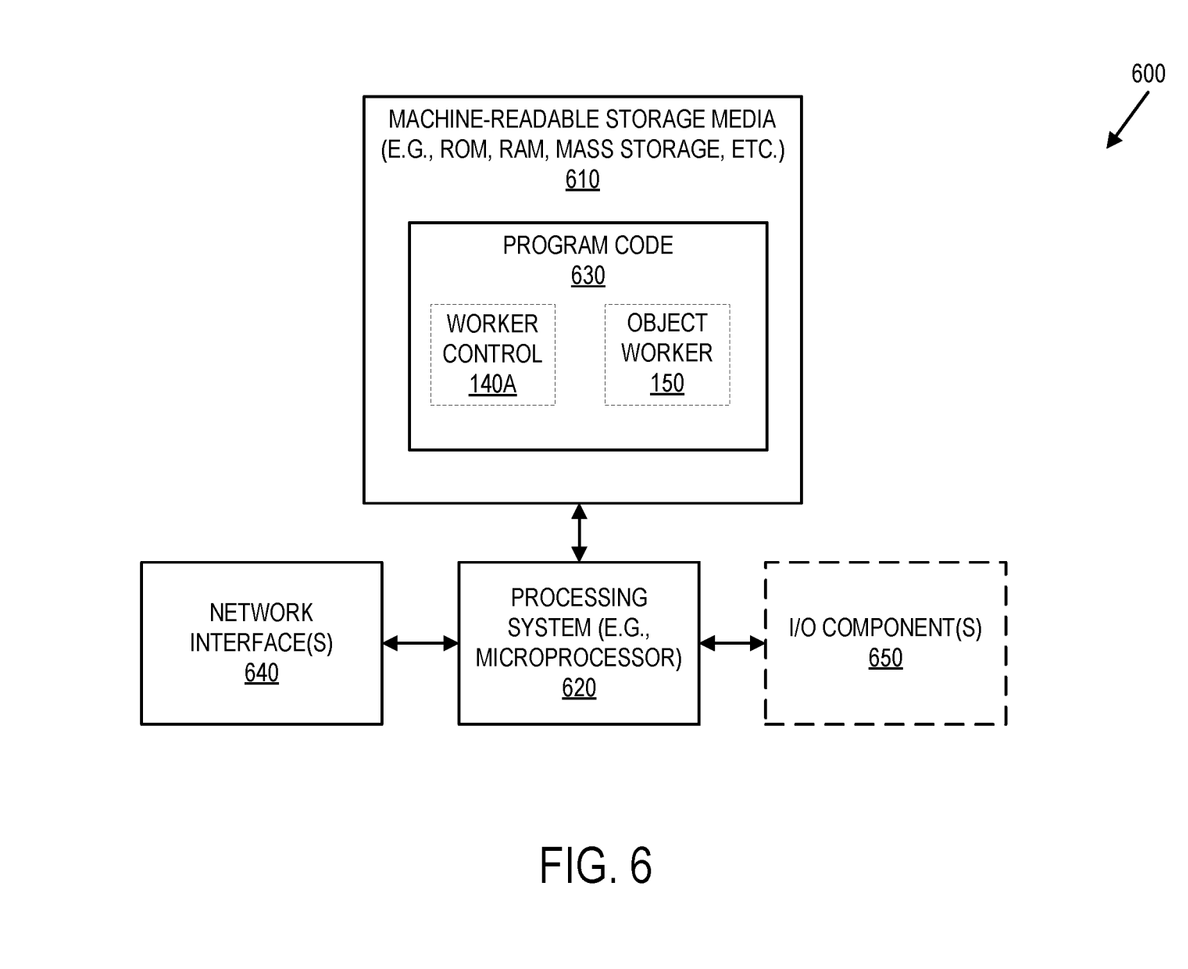
FIG. 6 is a block diagram illustrating a data processing system that can be used in an embodiment.

FIG. 6 illustrates a block diagram for an exemplary data processing system 600 that may be used in some embodiments. One or more such data processing systems 600 may be utilized to implement the embodiments and operations described with respect to the compute servers and/or client devices. Data processing system 600 includes a processing system 620 (e.g., one or more processors and connected system components such as multiple connected chips).

The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620. For example, the depicted machine-readable storage media 610 may store program code 630 that, when executed by the processor(s) 620, causes the data processing system 600 to execute the worker control 140A, the object worker 150, and/or any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

receiving, at a first one of a plurality of compute servers of a distributed cloud computing network, a first request for a first object that is to be handled by a first object worker, the first request being received from a client device, wherein the first object worker includes a single instantiation of a first piece of code that solely controls reading and writing access to the first object;

determining that the first object worker is instantiated for the first object and is currently running on the first one of the plurality of compute servers of the distributed cloud computing network;

processing, with the first piece of code, the first request;

transmitting a first response to the client device based on the processed first request;

receiving, at the first one of the plurality of compute servers from a second one of the plurality of compute servers, a first message to be processed by the first object worker, wherein the first message includes a second request for the first object from a second client device that is connected with the second one of the plurality of compute servers and not the first one of the plurality of compute servers;

processing, with the first piece of code, the first message received from the second one of the plurality of compute servers; and transmitting a first reply to the second one of the plurality of compute servers based on the processed first message.

2. The method of claim 1, further comprising:

receiving, at the first one of the plurality of compute servers of the distributed cloud computing network, a third request for a second object that is to be handled by a second object worker, the third request being received from the client device, wherein the second object worker includes a single instantiation of a second piece of code that controls reading and writing access to the second object;

determining that the second object worker has been instantiated for the requested second object and is currently running on the second one of the plurality of compute servers of the distributed cloud computing network;

transmitting a second message to the second one of the plurality of compute servers of the distributed cloud computing network for the second object worker to process;

receiving a second reply from the second one of the plurality of compute servers to the transmitted second message; and transmitting a second response to the client device based on the received second reply.

3. The method of claim 1, further comprising:

wherein the first one of the plurality of compute servers is a leader of a consensus group for the first object, and wherein the second one of the plurality of compute servers is a follower of the consensus group;

wherein processing, with the first piece of code, the first request includes writing to the first object; and replicating the writing of the first object to the second one of the plurality of compute servers.

4. The method of claim 1, further comprising:

receiving, at the first one of the plurality of compute servers, a third request for a second object that is to be handled by a second object worker, the third request being received from the client device, wherein the second object worker includes a single instantiation of a second piece of code that controls reading and writing access to the second object;

determining that the second object worker has been previously instantiated on a different one of the plurality of compute servers and is not currently running;

instantiating the second object worker at the first one of the plurality of compute servers, wherein all requests for the second object are to be processed by the second object worker;

causing a directory service to be updated to indicate that the second object worker is instantiated at the first one of the plurality of compute servers;

processing, with the second piece of code, the third request; and transmitting a second response to the client device based on the processed third request.

5. The method of claim 1, wherein the first request is received at the first one of the plurality of compute servers out of the plurality of compute servers as a result of the first one of the plurality of compute servers being closest to the client device in terms of an anycast implementation.

6. The method of claim 1, wherein processing, with the first piece of code, the first request includes reading and writing to the first object.

7. The method of claim 1, wherein processing, with the first piece of code, the first request includes retrieving the object from a remote object storage.

8. A non-transitory machine-readable storage medium that provides instructions that, when executed by a processor, cause the processor to perform operations comprising:

receiving, at a first one of a plurality of compute servers of a distributed cloud computing network, a first request for a first object that is to be handled by a first object worker, the first request being received from a client device, wherein the first object worker includes a single instantiation of a first piece of code that solely controls reading and writing access to the first object;

determining that the first object worker is instantiated for the first object and is currently running on the first one of the plurality of compute servers of the distributed cloud computing network;

processing, with the first piece of code, the first request;

transmitting a first response to the client device based on the processed first request;

receiving, at the first one of the plurality of compute servers from a second one of the plurality of compute servers, a first message to be processed by the first object worker, wherein the first message includes a second request for the first object from a second client device that is connected with the second one of the plurality of compute servers and not the first one of the plurality of compute servers;

processing, with the first piece of code, the first message received from the second one of the plurality of compute servers; and transmitting a first reply to the second one of the plurality of compute servers based on the processed first message.

9. The non-transitory machine-readable storage medium of claim 8, wherein the operations further comprise:

receiving, at the first one of the plurality of compute servers of the distributed cloud computing network, a third request for a second object that is to be handled by a second object worker, the third request being received from the client device, wherein the second object worker includes a single instantiation of a second piece of code that controls reading and writing access to the second object;

determining that the second object worker has been instantiated for the requested second object and is currently running on the second one of the plurality of compute servers of the distributed cloud computing network;

transmitting a second message to the second one of the plurality of compute servers of the distributed cloud computing network for the second object worker to process;

receiving a second reply from the second one of the plurality of compute servers to the transmitted second message; and transmitting a second response to the client device based on the received second reply.

10. The non-transitory machine-readable storage medium of claim 8, wherein the operations further comprise:

wherein the first one of the plurality of compute servers is a leader of a consensus group for the first object, and wherein the second one of the plurality of compute servers is a follower of the consensus group;

wherein processing, with the first piece of code, the first request includes writing to the first object; and replicating the writing of the first object to the second one of the plurality of compute servers.

11. The non-transitory machine-readable storage medium of claim 8, wherein the operations further comprise:

receiving, at the first one of the plurality of compute servers, a third request for a second object that is to be handled by a second object worker, the third request being received from the client device, wherein the second object worker includes a single instantiation of a second piece of code that controls reading and writing access to the second object;

determining that the second object worker has been previously instantiated on a different one of the plurality of compute servers and is not currently running;

instantiating the second object worker at the first one of the plurality of compute servers, wherein all requests for the second object are to be processed by the second object worker;

causing a directory service to be updated to indicate that the second object worker is instantiated at the first one of the plurality of compute servers;

processing, with the second piece of code, the third request; and transmitting a second response to the client device based on the processed third request.

12. The non-transitory machine-readable storage medium of claim 8, wherein the first request is received at the first one of the plurality of compute servers out of the plurality of compute servers as a result of the first one of the plurality of compute servers being closest to the client device in terms of an anycast implementation.

13. The non-transitory machine-readable storage medium of claim 8, wherein processing, with the first piece of code, the first request includes reading and writing to the first object.

14. The non-transitory machine-readable storage medium of claim 8, wherein processing, with the first piece of code, the first request includes retrieving the object from a remote object storage.

15. An apparatus, comprising:

a processor;

a non-transitory machine-readable storage medium coupled with the processor and that provides instructions that, if executed by the processor, cause the apparatus to perform operations including:

receive, at a first one of a plurality of compute servers of a distributed cloud computing network, a first request for a first object that is to be handled by a first object worker, the first request to be received from a client device, wherein the first object worker is to include a single instantiation of a first piece of code that solely controls reading and writing access to the first object;

determine that the first object worker is instantiated for the first object and is currently running on the first one of the plurality of compute servers of the distributed cloud computing network;

process, with the first piece of code, the first request;

transmit a first response to the client device based on the processed first request;

receive, at the first one of the plurality of compute servers from a second one of the plurality of compute servers, a first message to be processed by the first object worker, wherein the first message is to include a second request for the first object from a second client device that is connected with the second one of the plurality of compute servers and not the first one of the plurality of compute servers;

process, with the first piece of code, the first message received from the second one of the plurality of compute servers; and transmit a first reply to the second one of the plurality of compute servers based on the processed first message.

16. The apparatus of claim 15, wherein the operations further include:

receive, at the first one of the plurality of compute servers of the distributed cloud computing network, a third request for a second object that is to be handled by a second object worker, the third request is to be received from the client device, wherein the second object worker is to include a second piece of code that controls reading and writing access to the second object;

determine that the second object worker has been instantiated for the requested second object and is currently running on the second one of the plurality of compute servers of the distributed cloud computing network;

transmit a second message to the second one of the plurality of compute servers of the distributed cloud computing network for the second object worker to process;

receive a second reply from the second one of the plurality of compute servers to the transmitted second message; and transmit a second response to the client device based on the received second reply.

17. The apparatus of claim 15, wherein the operations further include:

wherein the first one of the plurality of compute servers is to be a leader of a consensus group for the first object, and wherein the second one of the plurality of compute servers is to be a follower of the consensus group;

wherein the operation to process, with the first piece of code, the first request is to include writing to the first object; and replicate the writing of the first object to the second one of the plurality of compute servers.

18. The apparatus of claim 15, wherein the operations further include:
  receive, at the first one of the plurality of compute servers, a third request for a second object that is to be handled by a second object worker, the third request to be received from the client device, wherein the second object worker is to include a second piece of code that controls reading and writing access to the second object;
  determine that the second object worker has been previously instantiated on a different one of the plurality of compute servers and is not currently running;
  instantiate the second object worker at the first one of the plurality of compute servers, wherein all requests for the second object are to be processed by the second object worker;
  cause a directory service to be updated to indicate that the second object worker is instantiated at the first one of the plurality of compute servers;
  process, with the second piece of code, the third request; and
  transmit a second response to the client device based on the processed third request.

19. The apparatus of claim 15, wherein the first request is to be received at the first one of the plurality of compute servers out of the plurality of compute servers as a result of the first one of the plurality of compute servers being closest to the client device in terms of an anycast implementation.

20. The apparatus of claim 15, wherein the operation to process, with the first piece of code, the first request is to include reading and writing to the first object.

21. The apparatus of claim 15, wherein the operation to process, with the first piece of code, the first request is to include retrieving the object from a remote object storage.

* * * * *